United States Patent [19]

Augier

[11] Patent Number: 4,658,876

[45] Date of Patent: Apr. 21, 1987

[54] AUTOMOTIVE VEHICLE TIRE AND MOUNTING SYSTEM THEREFOR

[75] Inventor: Pierre J. Augier, Grosse Pointe Park, Mich.

[73] Assignee: The Uniroyal Goodrich Tire Company, Akron, Ohio

[21] Appl. No.: 758,188

[22] Filed: Jul. 23, 1985

Related U.S. Application Data

[62] Division of Ser. No. 484,130, Apr. 12, 1983, abandoned.

[51] Int. Cl.[4] .................. B60B 3/04; B60B 21/10; B60B 25/10
[52] U.S. Cl. .................. 152/394; 152/398; 152/405; 152/412; 152/513
[58] Field of Search .................. 152/393–395, 152/397–402, 405, 409, 413, 539, 543, 386–388, 513, 504, 521; 301/63 DS

[56] References Cited

U.S. PATENT DOCUMENTS

| | | | |
|---|---|---|---|
| 2,787,312 | 4/1957 | Servaes | 152/513 |
| 3,006,692 | 10/1961 | Schubert | 152/413 X |
| 3,117,614 | 1/1964 | Amici | 152/393 X |
| 3,504,725 | 4/1970 | Fletcher et al. | 152/513 X |
| 3,999,588 | 12/1976 | Mitchell | 152/398 |
| 4,121,641 | 10/1978 | Nakasaki | 152/513 |
| 4,466,670 | 8/1984 | Kaji | 152/398 X |

FOREIGN PATENT DOCUMENTS 348883 10/1960 Switzerland .................. 152/398

*Primary Examiner*—David A. Scherbel
*Attorney, Agent, or Firm*—Harry F. Pepper, Jr.

[57] ABSTRACT

A pneumatic tire and a mounting system therefor, having constructional features designed to provide optimized operational characteristics. The tire has a low aspect ratio $\lambda$ and a low height ratio $\theta$ conforming substantially to the relations $\lambda = 0.236/\theta$ and $0.32 < \theta < 0.39$. The mounting system includes a vehicle axleborne drum and a pair of ring members adapted to be securely fastened to the drum, each ring member defining a bead seat, a bead restraining flange and a sidewall-supporting extension, and the ring members being adhered to the tire at the beads and the lower sidewalls. A layer of a suitable sealant at the juncture between each ring member and the drum renders the joints airtight. The tire includes a single ply radial carcass the turn-ups of which terminate in the lower sidewall regions of the respective adhesion zones between the tire and the ring members, and each of the beads is reinforced by a relatively thin, lightweight metal member in the form of a single loop having no free ends. A novel valving system for the tire, including a passageway in one of the ring members covered at one end by a quantity of a sealant having self-sealing properties, is also provided. This abstract is not to be taken either as a complete exposition or as a limitation of the present invention, however, the full nature and extent of the invention being discernible only by reference to and from the entire disclosure.

35 Claims, 12 Drawing Figures

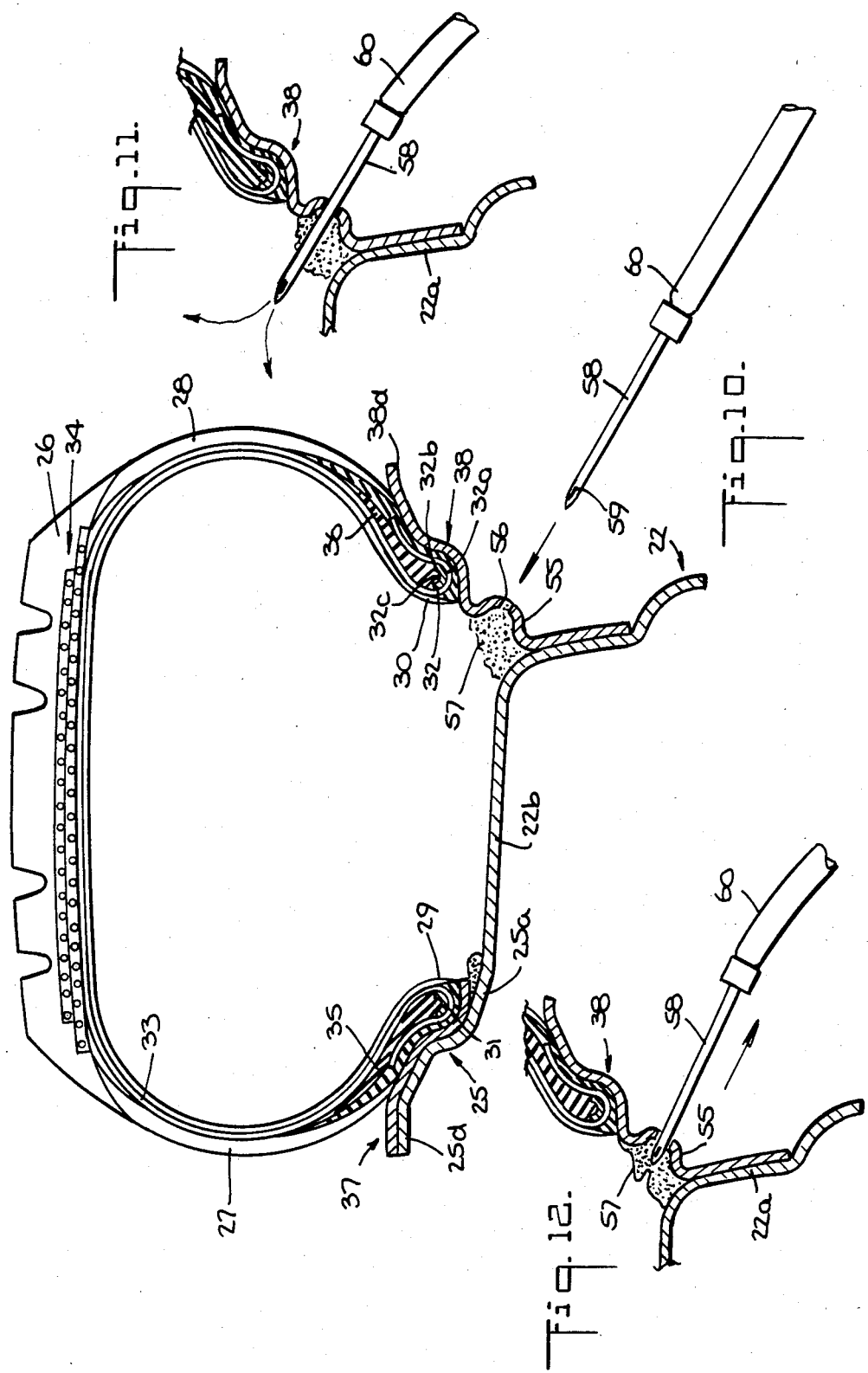

AUTOMOTIVE VEHICLE TIRE AND MOUNTING SYSTEM THEREFOR

This is a division, of application Ser. No. 484,130 filed Apr. 12, 1983, now abandoned.

This invention relates to an automotive vehicle tire and a mounting system therefor, the design and construction of which cooperate to provide an optimized set of structural and operational characteristics.

Automotive vehicles, especially automobiles and trucks, which are adapted to be driven (or, in the case of trailers, to be towed) at relatively high speeds over streets and highways, ride on pneumatic tires mounted on metal wheels, each such wheel having an annular body portion and a transverse rim portion welded to the outer periphery of the body portion, the rim portion terminating at its opposite lateral boundaries in a pair of generally upstanding rim flanges and defining intermediate the flanges directly adjacent thereto a pair of bead seats on which the beads of the associated mounted tire are located. In practice, the rim portions of the wheels for passenger cars and light trucks are usually of the "drop center" variety, i.e. each wheel rim is a one-piece structure and is formed with a circumferential deep well intermediate the rim flanges. Such a deep well is provided to enable the circumferentially essentially inextensible but radially somewhat deformable beads of a tire to be slipped one after the other in well-known fashion over one of the rim flanges and onto the wheel rim. As is well known, of course, once the two beads of a tire are located between the rim flanges of a wheel, the tire is inflated to a pressure sufficiently high to cause the beads to be shifted laterally (i.e. axially) outwardly of the rim onto the bead seats and up against the rim flanges.

A tire and wheel combination of this type is subject to a number of drawbacks and disadvantages, however, both in terms of problems that arise from the mounting of the tire on the wheel and in terms of problems that arise from the structural and operational characteristics of the tire per se, the wheel per se, and the assembled tire/wheel combination. Some of these, without intending them to be an exhaustive cataloguing, may be briefly described as follows.

I. Mounting Problems

Since wheel rim flanges, being intended to laterally confine and retain the tire beads on the rim, extend essentially radially outwardly from the base of the rim, i.e. at an angle of usually at least about 45° to the base and frequently almost perpendicularly to the same, the outermost diameters of the rim flanges are of necessity considerably larger than the rim diameter, i.e. the diameter of the rim in the region of the bead seats. Thus, with the inner diameter of the beads of the tire being substantially equal to the rim diameter, a portion of one bead has to be first forced over one of the rim flanges and dropped into the well, after which a leverlike tool is run around the wheel between the bead and the rim flange to force the remainder of that bead over the rim flange and onto the rim. The same procedure must then be repeated with the second bead of the tire. The operation of so forcing a tire bead over a wheel rim flange can, however, damage the rubber covering of the bead, thereby creating a situation where not only could air ultimately leak out of the tire via the bead/rim interface but dirt and moisture could get in under the bead and the deterioration of the rubber could even be propagated from the damaged portion of the bead to other parts of the tire. Again, once a tire has been so passed onto a wheel rim, it must then, as previously mentioned, be inflated to a pressure sufficiently high to displace or "pop" the beads onto their respective bead seats. This, however, gives rise to the possibility that the tire will be mismounted, i.e. will be mounted with an improper bead seating or with the beads not in full engagement with the rim flanges, which could be due to defects in the rim construction as well as to dimensional differences between the tire beads on the one hand and the rim on the other (it is a well-known fact that standardized metallic vehicle wheels, as manufactured, include appreciable dimensional tolerances). Generally, also, the mounting of the tire on the wheel requires the prior application of a lubricant to either the beads of the tire or the bead seats on the wheel rim to facilitate the shifting of the beads onto the bead seats, which is an extra operation to begin with and a messy one at that and does not necessarily ensure the proper seating of the beads. The presence of the deep well in the wheel rim, of course, also materially reduces the degree of clearance between the rim as a whole and the wheel axle, thereby reducing the amount of space available for location of the vehicle brake for that wheel.

II. Structural/Operational Problems

Whenever a vehicle is in motion, the tires on which it is riding are subject to a number of severe stresses. In a conventional tire/wheel combination, however, the tire is a separate entity from and is not adhered to the metal wheel rim. Of necessity, therefore, when the tire is placed under torque due to braking or acceleration of the vehicle, there will be, especially in the case of a tubeless tire, a tendency for some circumferential slippage of the tire relative to the bead seats, and hence for some degree of wear at the beads. The same lack of adhesion between the beads and the wheel rim, of course, also permits the beads to rock radially or transversely away from the rim flanges as the sidewalls are flexed while the tire is rolling over the ground, especially during cornering or when hitting a curb during a parallel parking maneuver. As each sidewall is flexed, moreover, a substantial amount of rubbing or chafing of the sidewall occurs where the portion of the sidewall just radially outwardly of the bead comes into repeated and intermittent contact with the radially outwardmost boundary region of the rim flange. Thus, perhaps because of manufacturing tolerances but perhaps also because the tire is constantly subjected to circumferential bead slippage, radial bead rocking, and bead chafing, small air leaks tend to develop at the bead/rim interfaces. Concomitantly, another possibility of an air leak developing exists at the location of the valve hole normally provided in the vehicle wheel rim to accommodate the separately inserted tire inflation valve. Should enough air escape from the tire through such air leaks, however, it may become possible for at least one of the beads effectively to roll laterally inwardly off its respective bead seat, thereby possibly causing a loss of control of the vehicle by the driver while the vehicle is in high speed motion.

Still further, in order to render the beads essentially resistant to circumferential extension as far as possible, each bead is of necessity reinforced by a heavy bead wire arrangement, generally in the form of a strand of one or more relatively thick wires or ribbons wound for a multiplicity of turns into a bulky and circumferentially substantially inextensible albeit radially deformable bead wire core bundle. The cost of manufacturing such bead wire cores and preparing them for incorporation in the tire is, of course, a significant element of the overall cost of manufacturing the tire. Moreover, the bulk of these bead wire cores makes it necessary that the radially inward regions of the sidewalls contiguous to the beads be made correspondingly thick through the addition of extra amounts of rubber. The weight of this added rubber, however, constitutes a substantial part of the weight of each tire and hence of the overall weight of the vehicle (and the vehicle weight is even higher whenever a fifth or spare tire is being carried in the vehicle), and obviously the power which must be expended in driving the vehicle corresponds directly to the weight of the vehicle. Finally, it is well known that if, while the vehicle is in high speed motion, the pressure in a tire becomes too low, whether by a process of slow leakage or through a more or less catastrophic deflation (such as in case of a blowout), so that the beads become able to move away from their associated rim flanges and laterally inwardly of the rim, the beads can actually come into the region of the well portion of the rim, drop into the well and then pass off the rim to effectively demount the tire from the wheel in a rapid sequence of stages that is essentially the reverse of the herein previously described sequence followed during the mounting of the tire on the wheel. Thus, not only does a conventional tire/wheel combination not provide any substantial "run flat" capability at high speeds, but the aforesaid ability of the deflated tire to be stripped off the wheel rim while the vehicle is moving at a high speed can bring about disastrous consequences to the occupants of the disabled vehicle as well as to innocent passers by.

As is also known, problems in the performance of a tire (e.g. in its ride and cornering properties) may arise due to the structural characteristics of the tire. Thus, on the one hand in conventional tires it is frequently the practice to extend one or more of the fabric carcass plies around the bead reinforcement and well up into the proximate sidewall, the theory being that this will provide an extra layer of fabric reinforcement in the region of the sidewall where bead chafing is most likely to occur. However, the cut end of each such turn-up ply then constitutes a mechanical discontinuity in the sidewall which, as the sidewall is repeatedly flexed, may become separated from the overlying sidewall rubber and thereby weaken the tire sufficiently to render it unfit for use. On the other hand, the almost worldwide trend in tire manufacture currently is toward tires with even lower aspect ratios. The "aspect ratio" of a tire, by definition, is the ratio of the section height of the tire to the width of the section at its widest portion, with the section height being the perpendicular distance between two lines parallel to the tire axis, one located at the toe ringdiameter and one tangent to the outer surface of the tread at the apex thereof, i.e. where it is intersected by the mid-circumferential plane of the tire. A low aspect ratio tire, however, while generally characterized by good handling (cornering) and rolling resistance properties, also tends to give a rough ride and to be subject to certain sidewall problems.

It should be noted at this point that some attempts have been made by others in the art to overcome some of the herein outlined disadvantages of conventional tires and tire/wheel combinations.

For example, wheels with semi-drop center rims (rims having only a shallow medial well formed therein) and flat base rims (rims having no well at all formed therein) have long been known for use especially with heavy trucks and other heavy-duty vehicles to facilitate the mounting and demounting of the usually large tires of such vehicles. A rim of such a wheel generally has one fixed and one demountable flange, with the demountable flange fitting into a gutter on the outboard edge of the rim to hold the tire in place.

Wheels with divided rims for both large and small vehicles, especially military vehicles, are also known. A divided wheel rim consists of two sections of either equal or unequal width, one of which carries a plurality of circumferentially distributed, axially extending studs or bolts while the other section is provided with a corresponding number of holes, so that the two sections can be bolted together with the aid of nuts in the same manner that a wheel is secured to a vehicle axle hub. The use of a divided rim of either of these types, however, entails the use of a special beadlock, of either the continuous channel type or the hinged segmental type, to hold a tire in position on the rim.

Again, in order to avoid the problems of circumferential bead slippage and radial bead rocking and roll-off, and in order to concomitantly provide some degree of run-flat capability, the cementing of the beads of a conventional tire directly to a wheel rim has been suggested, as shown, for example, by U.S. Pat. No. 3,938,573. The attainment of a limited degree of run-flat capability through the molding of a specially configured beadless tire directly onto a wheel rim entirely devoid of any rim flanges and bead seats has also been suggested, as shown, for example, by U.S. Pat. No. 4,253,510. This patent also discloses the use of a wheel with a flat base rim to provide greater space for accommodating a larger brake for the wheel. To the best knowledge of the present applicant, however, these approaches have so far not been adopted and implemented in the case of pneumatic tires by either tire or vehicle manufacturers (if they have been adopted at all, then this has certainly not been done on a large, industry-wide scale), nor have they been demanded by the purchasers and users of such products.

It is the primary objective of the present invention, therefore, to provide a pneumatic vehicle tire and also a mounting system therefor including, inter alia, a novel vehicle axle-borne drum, the designs and constructions of which are optimized to impart an overall optimized set of structural features and operational properties to the tire per se as well as to the ultimate tire/drum combination, thereby to enable the aforesaid and other drawbacks and disadvantages of conventional tires, wheels and tire/wheel combinations to be effectively avoided while at the same time enabling a number of heretofore unattainable advantages, more particularly described hereinafter, to be achieved.

Generally speaking, within the framework of its objectives the present invention provides a tire having an optimized overall construction and configuration and including an orientation of the sidewall portions located just radially outwardly of and contiguous to the beads at a relatively low angle of about 25° to the axis of the tire. Associated with the tire are two ring members which constitute a part of the mounting system for the tire and define the requisite bead seats and a pair of bead restraining flanges, the latter being of lower than conventional height and having respective shallow, low-angle extensions matched to the aforesaid low-angle sidewall portions. The ring members, over substantially the full extent of the bead seats, the bead restraining flanges and the low-angle extensions, are permanently adhered to the tire, e.g. by being bonded or vulcanized thereto, in the respective regions of the beads and the said radially inwardmost regions of the sidewalls contiguous to the beads. The ring members are further adapted to be mechanically releasably secured, as by means of bolts, lugs, or the like, to a vehicle axle-borne drum adjacent the opposite, i.e. the inboard and outboard, lateral boundaries of a peripheral skirt portion of the drum. In conjunction therewith, the beads are characterized by a novel and lightweight bead reinforcement, and further by low turn-ups of the carcass reinforcing fabric which terminate with the cut ends of the fabric located within the confines of the adhesion zones between the tire and the ring members, preferably in the regions over which the respective lower sidewall portions of the tire are adhered to the ring members.

The invention further provides a novel tire mounting drum having a body that is adapted to be securely bolted to the hub of a vehicle axle and further having a flat peripheral skirt that is provided with a relatively low or shallow flange section only at its inboard side (i.e. the side which will face inwardly of the vehicle when the drum is properly mounted on the axle). The skirt has a relatively gentle, radially inward taper of about 3° to the drum axis from the flanged, inboard side of the drum toward its flangeless, outboard side. In conjunction therewith, to the drum axis from the flanged, inboard side of the drum toward its flangeless, outboard side. In conjunction therewith, the inboard ring member is contoured to mate fully with and be capable of being secured to the said flange section of the skirt, which thus provides the support for the inboard ring member and properly positions the inboard bead seat and bead restraining flange. Correspondingly, the outboard ring member is contoured to be capable of being secured to the flangeless side of the drum so as to properly position the outboard bead seat and bead restraining flange.

The invention still further provides an airtight tire/drum combination through the application of a suitable sealant to the drum in the regions of the inner junctures between the skirt portion thereof and the two ring members. As presently contemplated, the sealant preferably is a material of any of the types disclosed in U.S. Pat. Nos. 3,981,342, 4,012,567 and 4,064,922, and to the extent necessary the disclosures of those patents are hereby incorporated herein, but it will be apparent that possibly other types of sealing materials having acceptable physical properties may also be used.

In accordance with a refinement of the invention, the outboard ring member may be further contoured to provide at one point of its periphery a suitable, preferably small depression or embossment, the same being so located on the ring contour that when the said ring member is affixed to the drum, the depression forms an inwardly open pocket intermediate the outboard bead seat and the region of juncture between the outboard ring member and the drum. The depression is provided at its outwardly directed bottom with a small hole and contains a suitable sealing material, preferably a sealant of the same types as are mentioned above, in an amount sufficient to cover the said hole fully. The sealant-containing pocket (because of its tackiness and self-sealing properties, the sealant will not flow out of the hole) thus constitutes a leak-proof valving system for the tire. Inflation of the tire can be easily effected by simply inserting and pushing through the hole and the sealant in the pocket, a hollow inflation needle having an air outlet opening at its leading free end and having its hollow interior in communication via its trailing end with a source of pressurized air located exteriorly of the tire. During such penetration of the sealant by the needle, the sealant flows about the needle and prevents loss of air. Thereafter, upon withdrawal of the needle the sealant will simply be drawn in behind it to fill the perforation formed by the needle (as will be understood from the above-identified patents).

The optimized designs and constructions of the tire and the mounting system therefor according to the present invention will also be characterized by still other features. For example, the tire when in an inflated but unloaded state is characterized by a special relationship between its aspect ratio (as hereinabove defined) and its height ratio. The "height ratio" of a tire, by definition, is the ratio of the section height of the tire to the radial distance between the tire axis and the previously mentioned line which is parallel to the tire axis and tangent to the trend surface at the apex thereof. The tire is further characterized by a novel construction and configuration of the bead reinforcements and by high-hardness extralength apex strips which extend from the bead reinforcements and terminate beyond the adhesion zones between the ring members and the lower sidewall regions of the tire, generally at a line located in the region between $\frac{1}{4}$ and $\frac{1}{3}$ of the height of the tire section as measured from the toe ring diameter of the tire. On the other hand, the mounting system is characterized, for example, by the presence of predetermined taper angles not only on the portions of the ring members adhered to the tire but also on the drum skirt, by special attachment systems for securing the ring members to the drum, and by a special ring width ratio. The "ring width ratio" of the tire/drum combination, by definition, is the ratio of the distance between the outer extremities of the adhesion zones to the width of the tire section at its widest portion.

Through the implementation of the present invention as aforesaid, mounting and demounting of the tire is greatly simplified. Thus, by virtue of the absence of an outboard flange on the drum per se and the tapering of the flat skirt portion thereof, the tire bead carrying the inboard ring member can be easily and without any forced deformation slipped onto the drum from the outboard side of the latter until the said ring member is seated on the existing flange portion of the drum skirt at the opposite, inboard side of the drum. It is because of this, of course, since the bead reinforcement is not subjected to deformations and distortions during mounting or demounting of the tire, that the bead reinforcement according to the present invention can be made much thinner and lighter than conventional multiple-turn multiple-wire bead core bundles; in fact, it is contemplated to use as a bead reinforcement a metal member in the form of a single loop having no free ends, a generally inwardly convex arcuate inner surface, and preferably also a longitudinal peripheral channel formed in the outer surface of the metal member, the presence of the channel imparting to the member a generally U-shaped cross-section. Moreover, with a layer of sealant having been previously applied to the drum both at the base of the inboard skirt flange portion and at the juncture between the skirt and the body of the drum, the subsequent tightening of the two ring members against the drum automatically creates an airtight seal around the entire circumference of the drum.

Still further, by virtue of its aspect ratio to height relationship, a tire according to the present invention is found to have a greater load-carrying capacity compared to its own weight, i.e. to have an on the average 10% higher "tire efficiency" or "load efficiency" (the ratio of tire load to tire weight) than a conventional tire of equivalent strength. The converse of this is, of course, that for equivalent load-carrying capacities the tire of the present invention weighs considerably less than a conventional tire. At the same time, the fact that the tire according to the present invention has, as previously mentioned, low-angled lower sidewall regions and apex or filler strips of extra length and higher hardness than a conventional tire enables optimum tire performance properties (ride, handling, wear resistance, fatigue resistance, etc.) to be achieved.

The foregoing and other objects, characteristics and advantages of the present invention will be more fully understood from the following detailed description thereof when read in conjunction with the accompanying drawings, in which:

FIGS. 8 and 9 are enlarged, fragmentary, perspective views of the attachment system for the inboard ring member and the flanged portion of the drum skirt in two different sequential positions during the mounting of the tire on the drum;

FIG. 10 is a fragmentary sectional view similar to FIG. 1 but with the section taken on a different line and illustrates the tire valving system according to the present invention; and FIGS. 11 and 12 are fragmentary sectional views of the valving system shown in FIG. 10 and illustrate the manner of use thereof.

Figure 6:
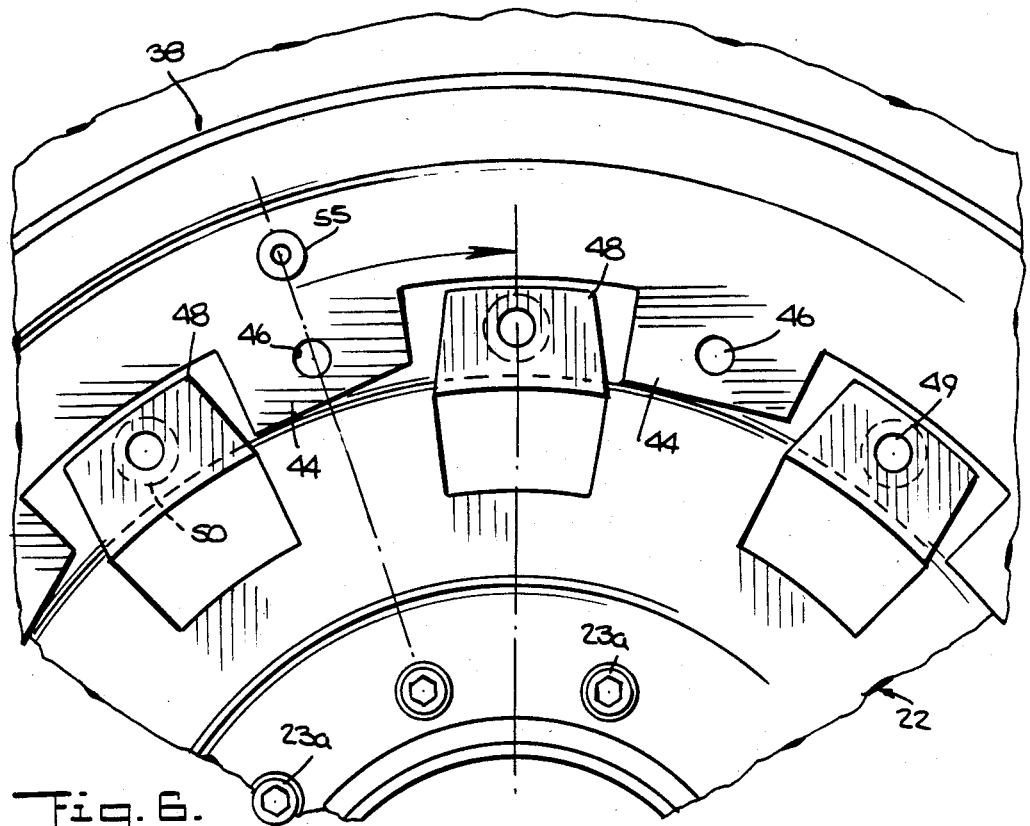
FIGS. 6 and 7 are enlarged, fragmentary, elevational views of the tire/drum combination as seen from the outboard side thereof and illustrate the manner in which the attachment of the outboard ring member to the drum is effected and also show the location of the novel valving system of the present invention.
Figure 7:
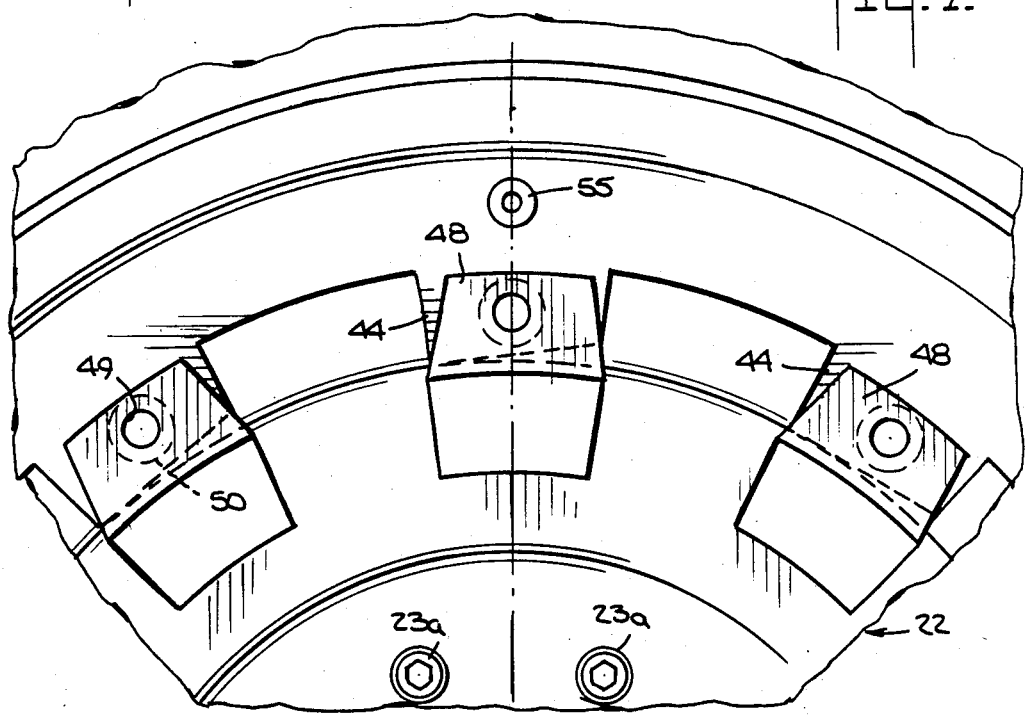

Referring now to the drawings in greater detail, in FIG. 1 there is shown a tire and mounting drum combination 20 including a pneumatic tire 21 and a drum 22 on which the tire is mounted in a manner to be more fully described hereinafter. The drum 22, which has a body portion 22a and a transverse peripheral skirt portion 22b, is secured at its mid-region to the hub 23 of a vehicle axle 24 by means suitable bolts or screws 23a having specially configured heads, for example heads which are provided, as schematically indicated in FIGS. 6 and 7, with internal hexagonal sockets (or any other type of special tool-engaging portions) designed to inhibit removal of the drum from the axle without the use of special tools. In accordance with the present invention, the drum skirt 22b (which encloses the vehicle brake, not shown) is provided at its free end with a circumferential flange section 25. No corresponding flange section is provided at the other side of the drum. By virtue of its form, it will be understood, the drum 22 is unidirectional, i.e. when properly mounted on a vehicle axle it will always have its flanged side directed inboard of the vehicle (to the left in FIG. 1) and its flangeless side directed outboard of the vehicle (to the right in FIG. 1), and correspondingly, for reasons which will become clear presently, the tire 21 will always have to be mounted on the drum with a given one of its sides directed inboard and the other side directed outboard of the vehicle, so that, by design, mismounting of the tire is rendered effectively impossible. Portions of the drum 22 and the tire 21 are therefore, on occasion designated herein as being either "inboard" or "outboard" portions.

The tire 21 has a generally toroidal shape and includes a tread 26 overlying the circumferential crown region of the tire, and a pair of sidewalls 27 and 28 extending generally radially inwardly from the tread and terminating in a pair of beads 29 and 30 reinforced interiorly by a pair of metal members 31 and 32. The body from one bead to the other and anchored to the bead reinforcements 31 and 32, and a tread-reinforcing belt 34 of tire cords is interposed between the tread and the underlying portion of the carcass ply over the entire circumferential crown region of the tire. The anchoring of the carcass cords to the bead reinforcements is effected by turning the end regions 33a and 33b of the ply 33 up around the metal members 31 and 32 from the inside of the tire to the outside, and respective apex or filler strips 35 and 36 are fitted into the spaces above the metal members and between the main and turned-up portions of the carcass ply. Carcass ply turn-ups, bead wire reinforcements and apex strips are, of course, per se common elements of pneumatic tires, but as will be more fully explained presently the forms and arrangements of these elements in the tire 21 differ materially from those of their known antecedents in conventional tires and constitute material parts of the present invention.

It should be noted, in passing, that in the illustrated construction of the tire 21, the carcass 33 is constituted by a single ply of tire cords disposed in radial planes, i.e. with the cords running at an angle of substantially 90° to the mid-circumferential or mediun equatorial plane of the tire, and the belt 34 (as is conventional in radial ply tires) is constituted by a superposed pair of plies 34a and 34b of tire cords extending generally circumferentially of the tire opposed relatively low bias angles to the mid-circumferential plane, i.e. with the cords in each belt ply running at an angle of about 15°–35° and preferably about 25°, to the mid-circumferential plane and crossing the cords of the other belt ply. Also, the tire cords of the carcass and the belt may be made of any of the materials that are conventionally used by the tire manufacturers in such products, namely, rayon, nylon, polyester, steel, glass fiber, aramid fiber, and the like. Correspondingly, the drum 22 and its component parts and adjuncts will generally be made of metal, but they could be molded of suitable reinforced plastics, e.g. molded fiberglass. It will be understood, however, that one or more of these known aspects of the various constructions described could be modified as desired without in any way affecting the fundamental principles or the implementation of the present invention.

Figure 1:
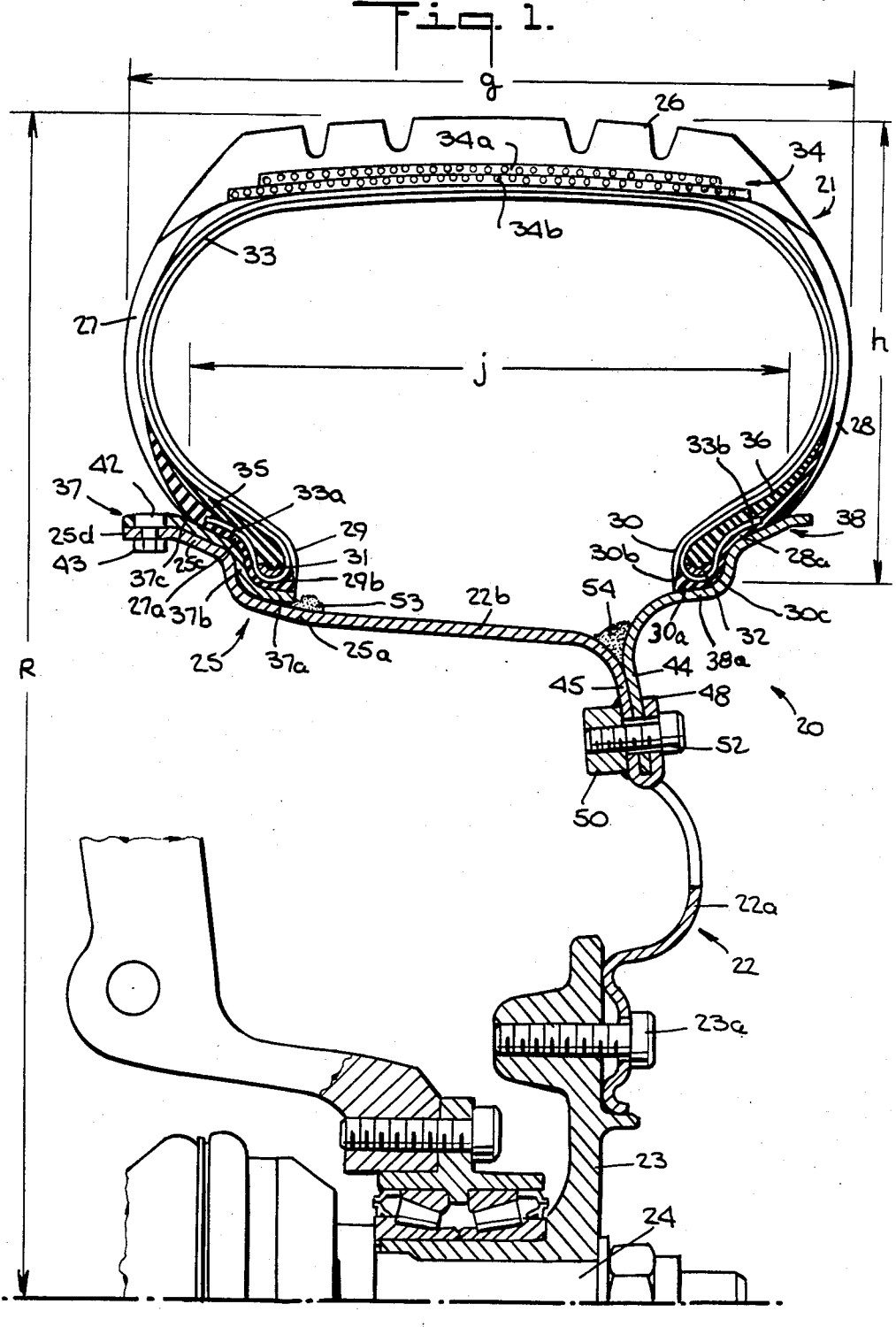
FIG. 1 is a fragmentary, partly elevational, transverse or axial section through a tire/drum combination according to the present invention.
Figure 2:
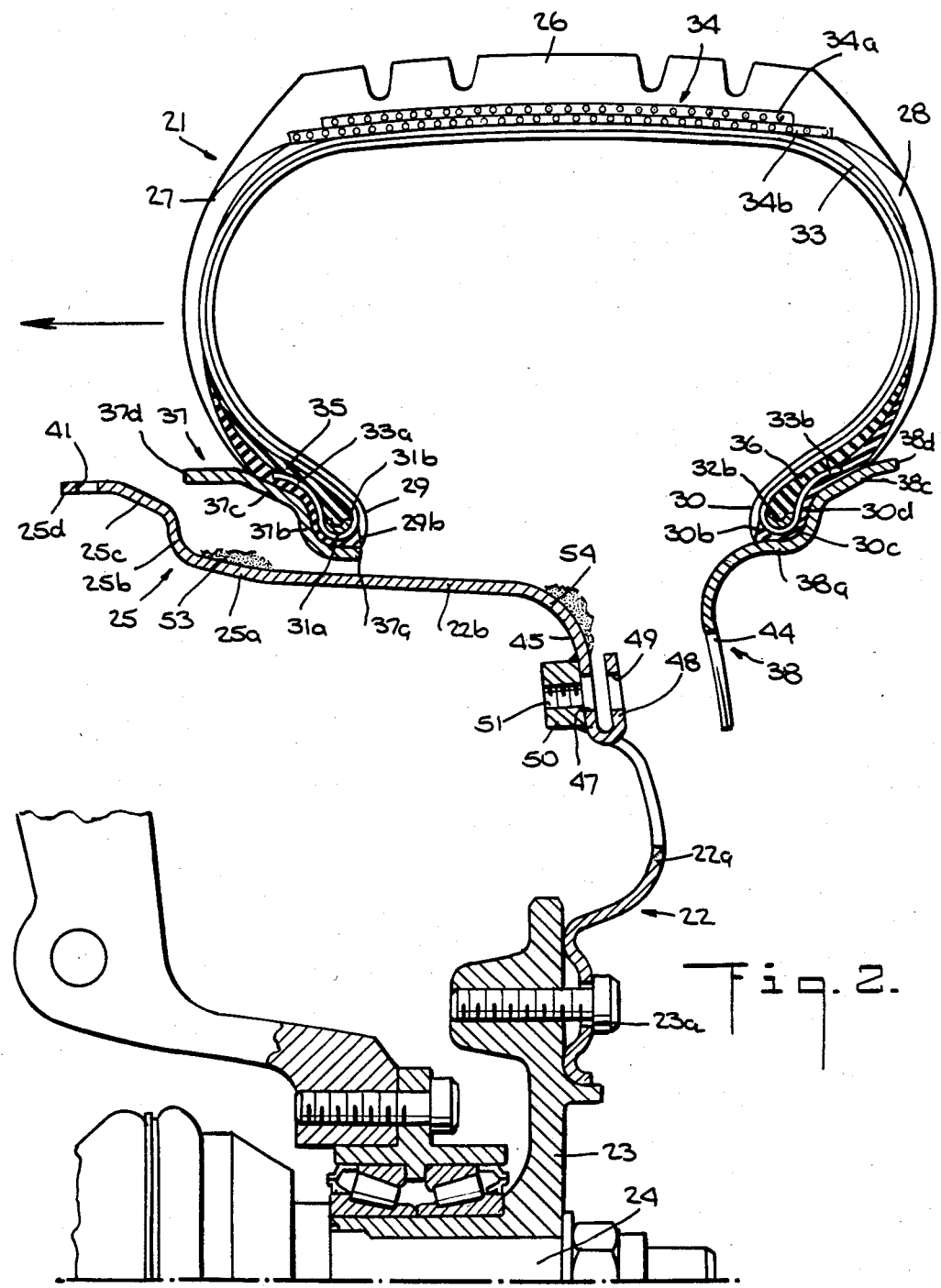
FIG. 2 is a view similar to FIG. 1 but illustrates the tire with its two adhered ring members in the process of being mounted on the drum.
Figure 3:
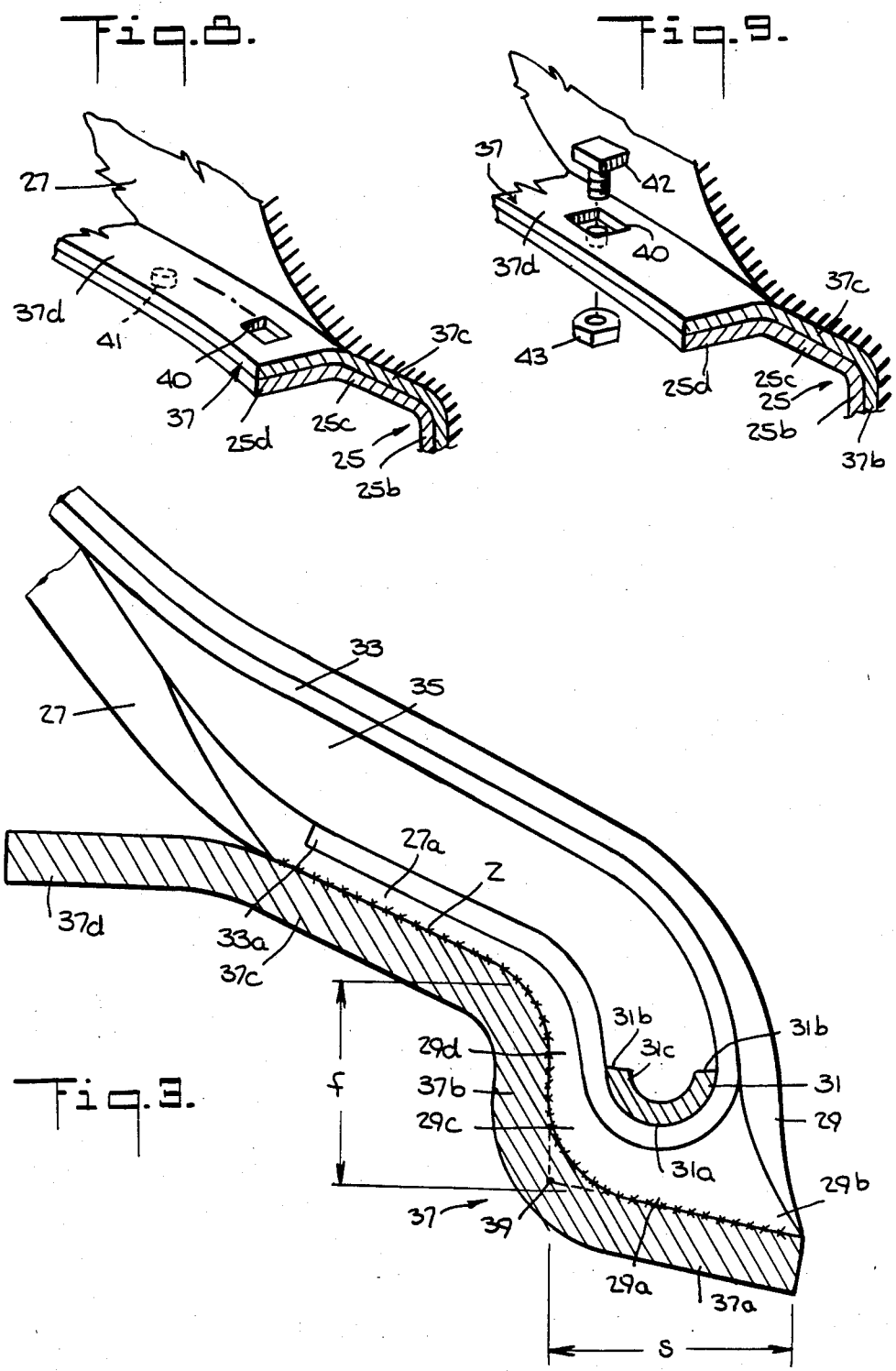
FIG. 3 is a greatly enlarged, fragmentary, sectional view of the inboard bead and lower sidewall region and the thereto adhered ring member of the tire shown in FIGS. 1 and 2, and illustrates certain additional constructional details thereof.
Figure 4:
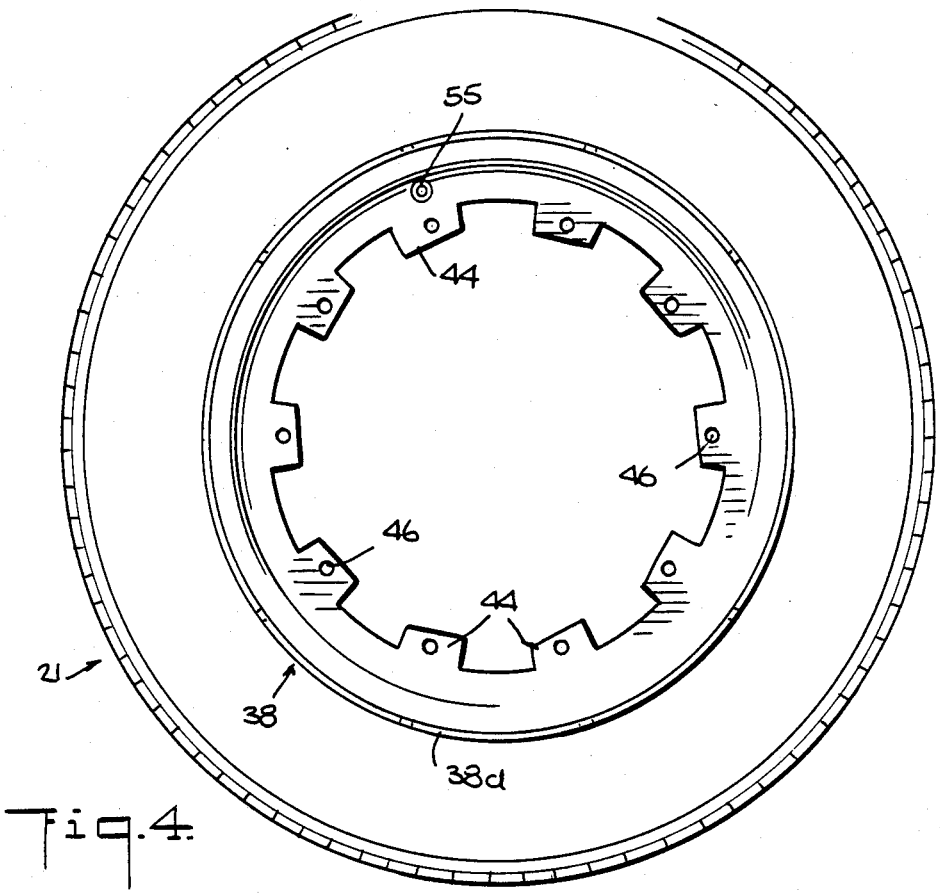
FIG. 4 is an elevational view of the pneumatic tire and its adhered outboard ring member as seen from the outboard side thereof and shows the elements which constitute a part of the attachment system for this ring member and the drum.
Figure 5:
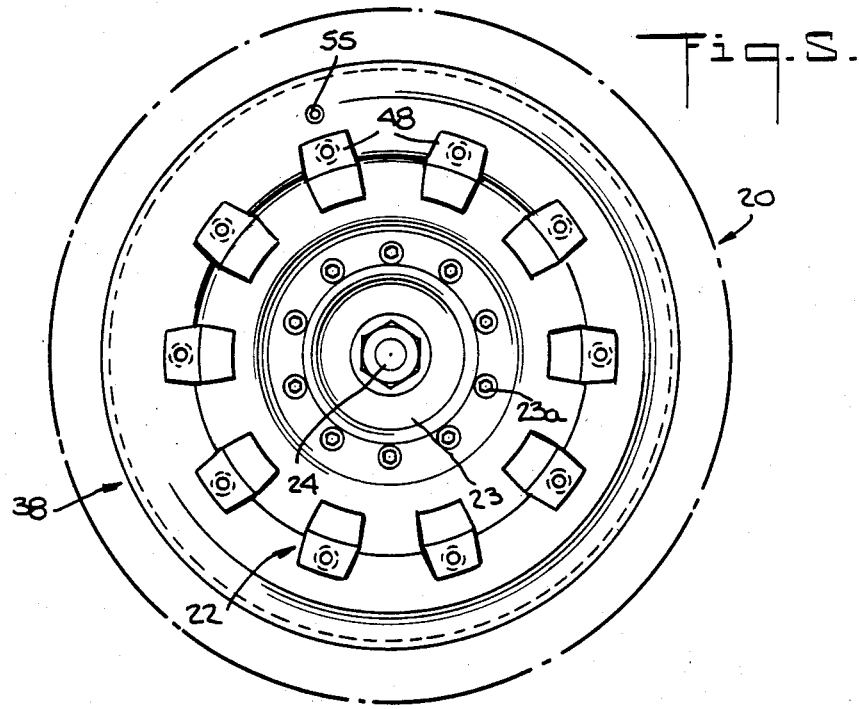
FIG. 5 is an elevational view of the tire/drum combination as mounted on a vehicle axle, the view being taken from the outboard side of the tire/drum combination and showing further elements of the outboard ring member attachment system.

As best shown in FIGS. 1, 2 and 3, the tire and drum combination according to the present invention further includes a pair of ring members 37 and 38 which are contoured to define respective bead seats 37a and 38a tapering radially inwardly of the tire at angles of about 5° to the tire axis (i.e. with a tolerance of about ±1°) and respective contiguous bead restraining flanges 37b and 38b, the latter extending generally radially outwardly of the tire almost perpendicularly to the tire axis and having respective sidewallsupporting extensions 37c and 38c oriented at relatively shallow angles of about 25° to the tire axis. The ring members further have respective outer peripheral extensions 37d and 38d which (for a purpose that will become clear as the description proceeds) are oriented to extend almost parallel to the tire axis.

The ring members 37 and 38 are permanently adhered to the tire 21 at the inboard and outboard sides of the tire. Thus, the zone of adhesion between the sections 37a, 37b and 37c of the inboard ring member 37 and the tire (this zone is designated Z and is diagrammatically represented by the cross-hatching in FIG. 3) extends over the surface of the foot 29a of the bead 29 from its heel 29b to its toe 29c, thence over the outer surface of the side portion 29d of the bead, and finally over the outer surface of the region 27a of the inboard sidewall 27 located just radially outwardly of and contiguous to the bead 29. The zone of adhesion between the sections 38a, 38b and 38c of the outboard ring member 38 and the tire correspondingly extends over the surface of the foot 30a of the bead 30 from its heel 30b to its toe 30c, thence over the outer surface of the side portion 30d of the bead 30, and finally over the outer surface of the region 28a of the outboard sidewall 28 located just radially outwardly of and contiguous to the bead 30. The adhesive attachment of the ring members 37 and 38 to the tire can, of course, be effected during the manufacture of the tire by vulcanizing the ring members (if need be, suitably pretreated with a metal-to-rubber or a plastics-to-rubber adhesion-promoting substance of any of the types well known in the art) directly to the tire in the mold. Alternatively, however, it may be effected after the manufacture of the tire per se by adhering the ring members to the appropriate portions of the tire with the aid of suitable adhesive or bonding agents known in the industry for bonding rubber to metals, for example, adhesives such as are available commercially from Lord Manufacturing Company under the registered trademark CHEMLOK.

As further clearly shown in FIGS. 1, 2 and 3, the turned-up portions 33a and 33b of the carcass ply 33 are considerably shorter than is usually the case in conventional tires. In particular, the ply turn-ups terminate and are completely confined within the portions of the adhesion zones defined between the sections 37c and 38c of the ring members 37 and 38 and the respective tire sidewall regions 27a and 28a. Concomitantly, the rubber apex or filler strips 35 and 36 used for the purposes of the present invention have a relatively high Shore "A" hardness (on the order of about 90-94) and are considerably longer than is usually the case in conventional tires. In particular, the apex strips extend from the bead reinforcements 31 and 32 into the sidewalls 27 and 28 and terminate beyond the adhesion zones but short of the widest portion of the tire, i.e. short of the location of the greatest separation, denoted by the dimension g in FIG. 1, between the sidewalls 27 and 28. Preferably the apex strips terminate at a location between about ¼ and ⅓ of the section height of the tire, the section height, denoted by the dimension h in FIG. 1, being the distance from a line parallel to the axis of the tire and constituting the toe ring diameter of the tire to a line parallel to the axis and tangent to the outer surface of the tread at its apex (i.e. at the mid-circumferential plane). In the present case the toe ring diameter is taken to be the line, parallel to the tire axis, which passes through the two points of intersection (only one of these, designated 39, is shown in FIG. 3 only) between the imaginary straight-line extensions of the tapered bottom surfaces of the bead portions 29a and 30a on the one hand and the associated generally radial outer side surfaces of the bead portions 29d and 30d on the other hand.

The utilization of these features leads to a number of advantages. One is due to the fact that, with the carcass ply turnups 33a and 33b terminating the lower or radially inwardmost sidewall portions 27a and 28a, the remaining outer portions of the sidealls are free of the mechanical discontinuities that would otherwise be present therein were the cut ends of the poly turn-ups to be located in the outer sidewall portions beyond the ends of the adhesion zones. This arrangement, therefore, effectively renders impossible the occurrence of turn-up ply separations in the outer sidewall portions (which is a substantial risk in a conventional tire because the sidewalls thereof, where the ply turn-ups terminate, are subject to severe flexural stresses whenever the tire rolls over the ground under load). Conversely, turn-up ply separations cannot occur at all in the lower sidewall regions 27a and 28a because the same are not subject to any flexural stresses when the tire is in use, being adhered to as well as fully supported by the ring member sections 37c and 38c.

Another advantage is due to the fact that the supported lower sidewall regions 27a and 28a are oriented at relatively shallow angles of about 25° to the tire axis (in what may be termed in effect a cantilever arrangement). This arrangement has certain beneficial effects on the ride and handling properties of the tire, i.e. it imparts an acceptable verticle elasticity to the tire and thereby tends to compensate for the hereinbefore mentioned somewhat less desirable properties of the tire that result from its low aspect ratio. Moreover, the adhesion of the lower sidewall regions and the beads to the respective sections of the the ring members in the manner shown ensures that circumferential bead slippage, radial bead rocking and bead roll-off, and bead chafing are effectively inhibited. The purpose of the angling of the ring member extensions 37d and 38d downwardly or radially inwardly relative to the sections 37c and 38c, and hence away from the unsupported regions of the sidewalls 27 and 28, will now also be clear. Thus, by virtue of this arrangement the potential for a bead chafing-like rubbing contact between the ring members and the tire sidewalls where the unsupported regions thereof adjoin the supported and adhered regions is substantially minimized.

As previously mentioned, the tire according to the present invention is also characterized by novel internal bead reinforcements. Basically, these novel bead reinforcements can have various cross-sectional configurations, as will be more fully described hereinafter, but in all cases each reinforcement will be in the form of a solid single-body or unitary metal member having no free ends, which can be achieved, for example, either by directly forming the member as a full ring or by first forming the member as a linear body, then bending the same into a circle of appropriate diameter to bring the ends of the body into contact with each other, and finally butt-welding the said ends to each other. Furthermore, in accordance with the presently contemplated best mode of practicing the invention, the reinforcing members 31 and 32 preferably also have a generally U-shaped cross-section with a substantially uniform wall thickness. Thus, as best shown in FIG. 3 for the inboard bead reinforcement 31, the same is characterized by an inner surface 31a of convexly semicircular curvature and an outer surface having a pair of flat, circumferentially extending, lateral regions 31b and therebetween a circumferentially extending, medial, outwardly open channel 31c of concavely semicircular curvature. Correspondingly, the outboard bead reinforcement 32 is identical in all respects with the reinforcement 31, as can be seen in FIGS. 1, 2 and 10, being characterized in the preferred form by an inner surface 32a of convexly semicircular curvature and an outer surface having a pair of flat, circumferentially extending, lateral regions 32b and a medial, outwardly open, circumferentially extending channel 32c. The terms "inner" and "outer" as applied to the surfaces of the reinforcement members 31 and 32, it should be understood, are here used to denote the respective surfaces of the annular or ringshaped reinforcements which are directed inwardly and outwardly of the latter. The specific cross-sectional dimensions of each such bead reinforcement (namely, the radius of curvature of its inner surface 31a or 32a, the radius of curvature of its channel 31c or 32c, the "height" of the U, i.e. the distance from the plane of the ends of the legs 31b or 32b of the U to a plane tangent to the bottom of the U at its center line, and the wall thickness of the U, i.e. the difference between the said two radii) will, of course, depend on the size of the tire in which the reinforcement member is incorporated and on the stresses to which it will be subjected in use. As a matter of general design, however, it is contemplated the dimensions of each single-body single-turn reinforcement intended for use in a tire of a given rim size or bead diameter should be such as to provide such reinforcement with a metal surface area equal to approximately 50% of the metal surface area of a conventional multiple-wire multiple-turn bead core bundle intended for use in a correspondingly sized conventional tire. It will be apparent, therefore, that the bead reinforcements 31 and 32 are considerably smaller in volume and less bulky than conventional multiple-turn multiple-wire bead core bundles.

It will also be understood that the use of such small bead reinforcements in the form of solid, single-turn, single-body endless metal members in lieu of the conventional multiple-turn multiple-wire bead core bundles is rendered possible by the confluence of a number of different factors. One of these is the fact that the bead reinforcements 31 and 32 of the present invention will generally not be subjected, during the manufacture of the tire 21, during the mounting or demounting of the tire on the drum 22, and when the tire is in use, to the types of distortions and flexural stresses to which conventional bead wire cores are subjected. In this regard, moreover, it will be understood that the formation of the reinforcements with a substantially U-shaped cross-section through the provision of the longitudinal or circumferential channels in their outer surfaces entails two additional advantages. On the one hand, the presence of the upstanding lateral wall portions bounding the channel, i.e. the legs of the U, ensures that the metal members have sufficient beam strength and stiffness (resistance to flexure) to withstand, with an adequate margin of safety, such stresses as they will be subjected to during handling as well as in use. On the other hand, the absence of material represented by the channels not only does not have an adverse effect on the strength and stiffness of the reinforcements but at the same time enables the weight of the reinforcements to be reduced as much as possible. Merely by way of example, whereas a conventional rubber-impregnated bead wire core bundle for a 13-inch bead diameter tire would weigh on the order of about 5.5 ounces, a bead reinforcement according to the present invention would have a weight of about 2 ounces, which constitutes a weight saving of well over 60%.

Still others of the various factors which render the use of the small bead reinforcements of the present invention possible are the fact that the tire has a low height ratio and the fact that the ring members 37 and 38, due to their adhesion to the beads and lower sidewall regions of the tire, aid the bead reinforcements in supporting the inflation forces encountered in the bead areas. At the same time, by virtue of the fact that the bead reinforcements of the present invention are considerably smaller in bulk or volume than the conventional bead wire core bundles, not only the beads 29 and 30 themselves but also the corresponding bead seat sections 37a/38a and bead restraining flange sections 37b/38b of the ring members 37 and 38 may be made considerably smaller than they would have to be in a conventional tire/wheel combination. Merely by way of example, in a typical 13-inch bead diameter tire according to the present invention, the widths of the bead feet 29a/30a and of the bead seat portions 37a/38a of the ring members, and the heights of the bead sides 29d/30d and of the bead restraining flange portions 37b/38b of the ring members, denoted by the respective dimensions s and f in FIG. 3, are 0.450 inch and 0.350 inch, respectively. Both of these dimensions are substantially less than the dimensions of corresponding elements of conventional tires and wheel rims. The presence of smaller beads in the tires means of course, that the tires contain smaller quantities of rubber in the beads and the contiguous lower regions of the sidewalls. As a consequence, the weight of the tires and therethrough the overall weight of the vehicle on which the tires are mounted are materially reduced with respect to corresponding conventional tires. Another advantage accruing from the present invention is, therefore, the fact that the amount of energy consumed in driving a vehicle riding on tire/drum combinations according to the present invention is correspondingly reduced.

Merely in passing it should be noted that although bead reinforcements having the semicircular channeled cross-sectional configurations illustrated and so far described herein are preferred, the bead reinforcements may have slightly different cross-sectional configurations within the basic concepts of the present invention.

Thus, the inner surfaces 31a/32a and the outer longitudinal channels 31c/32c of the reinforcements need not be precisely of semicircular curvature but could be otherwise arcuate (parabolic, hyperbolic, etc.). The legs of the U may also have free end sections that are linear, i.e. non-circular, and preferably parallel extensions of the circularly curved portions. The overall cross-sectional configuration could even be generally crescent-shaped, i.e. with the channel having a somewhat greater radius of curvature than the inner surface of the reinforcement member and with the wall thickness of the reinforcement cross-section as a consequence not being uniform throughout from one not necessarily flat lateral edge to the other. It would also be possible for the channel to be in the form of a narrow groove or even omitted altogether. As a still further alternative, the inner surface of the bead reinforcement may even have at least one generally flat circumferential portion, although in such a case it would be preferred for the lateral boundaries of any such portion to be rounded. It will be understood, however, that such an arrangement too is to be considered an arcuate surface configuration within the concept of the present invention. In any event, the herein disclosed semicircular configuration is preferred primarily because this is a good contour for the purposes of the tire building and shaping operations, in that it makes for a smooth fitting and rotation of the tire body plies around the reinforcements while at the same time providing an absence of relatively sudden directional changes for the portions of the plies passing about the reinforcements.

As yet another refinement of the present invention, it is contemplated that the radially inwardmost sections of the apex or filler strips 35 and 36 will be contoured in accordance with the contours of the outer surface of the reinforcements. Thus, where the bead reinforcements are provided with outer channels, such as 31c/32c, the apex strips in a corresponding fashion would be provided with peripheral projecting ribs matched to extend into the channels, thereby to provide a better interlock between the apex strips and the bead reinforcements during the tire building and shaping operations as well as in the finished tire.

Reverting now to the ring members 37 and 38, it will be understood that the manner of attachment thereof to the drum 22, which can best be comprehended from FIGS. 1, 2 and 4 to 9, should be such as to fulfill certain specific objectives of the present invention. Principally, of course, the attachment system must serve to ensure the proper location of the tire 21 on the drum and relative to the vehicle axle. The attachment system must also be such as to render and maintain the tire/drum combination fully airtight under all anticipated normal conditions of use, and it must be sufficiently sturdy to withstand the severe stresses to which it will be subjected while the tire is in service. Still further, the attachment system should be simple enough to permit the tire to be readily mounted on and demounted from the drum without entailing the imposition, during such operations, of any undue stresses on and deformations of the beads 29 and 30 and the bead reinforcements 31 and 32. Finally, in somewhat of a contradiction to the aforesaid simplicity, it is contemplated that the attachment system, because of the uniqueness of the tire/drum combination of the present invention and the complete departure of its construction from that of the heretofore conventional tire and wheel arrangements, should nevertheless also be so constructed as to inhibit its dismantling without the use of special tools.

With the foregoing objectives kept in mind, it will be seen that the attachment system for the inboard ring member 37 is relatively simple. Basically, the ring member 37 has an overall configuration matched to that of the flange section 25 of the skirt 22b of the drum 22 (see FIGS. 1 and 2). Thus, the said flange section has a portion 25a corresponding to the bead seat section 37a of the ring member 37, a portion 25b corresponding to the bead restraining flange section 37b, a portion 25c corresponding to the lower sidewall supporting section 37c, and a peripheral extension 25d corresponding to the peripheral extension 37d. The only difference between the two configurations is that, whereas the taper angle of the bead seat defining section 37a of the ring member 37 is about 5° to the axis of the tire, the taper angle of the portion 25a of the skirt flange section 25 is about 15° to the axis of the tire, as a result of which a small generally wedge-shaped space is formed between the ring member 37 and the skirt 22b at the region of juncture therebetween when the ring member is mounted on the drum.

Referring now also to FIGS. 8 and 9, it will be seen that the attachment means which enable the ring member 37 to be securely fastened to the drum 22 include the peripheral extension 37d of the ring member and the extension 25d of the skirt flange section 25, the respective sets of circumferentially distributed openings or bores 40 and 41 formed therein, and the associated fasteners in the form of bolts 42 and nuts 43. It will be understood, of course, that the actual number of paired openings 40/41 and bolt and nut combinations 42/43 that will be required to effect a secure attachment of the ring member 37 to the drum 22 may vary for tires of different sizes and different intended conditions of use and hence will be selected as desired, but it is contemplated that preferably at least about ten and possibly as many as a dozen or more such fastening means should be employed as a minimum. It will also be apparent that the precise form of the fastening mechanism may likewise be varied as desired. Merely by way of example, in the illustrated embodiment thereof the openings 40 in the ring member extension 37d as well as the heads of the bolts 42 are square in outline, while the bores 41 in the flange section extesion 25d and the threaded shanks of the bolts are circular in outline, so that the bolts 42, the shanks of which are sufficiently long to extend through the flange section extension 25d, can be prevented from rotating while the respective nuts 43 are tightened against the underside of the extension 25d.

By way of contrast to the foregoing, the attachment system for the outboard ring member 38 is somewhat more complex. Referring now more particularly to FIGS. 4 to 7 in conjunction with FIGS. 1 and 2, it will be seen that the outboard ring member 38, in addition to the sections 38a to 38d already described, has a circumferential laterally inwardmost portion in the form of a plurality of projecting parts 44 adapted to closely overlie a circumferential radially outwardmost portion 45 of the drum body 22a. Each of the projecting parts 44 is provided with a respective opening 46, and correspondingly the drum body portion 45 is provided with a plurality of openings 47. The drum body is further provided with a plurality of struck-out parts 48 which are bent up to overlie the radially outwardmost portion 45 of the drum body. Each of the struck-out parts 48, the number of which is equal to the number of projecting parts 44 on the outboard ring member 38, is provided with an opening 49 aligned with the respective opening 47 in the drum body portion 45. On its inboard side the drum body 22a is further provided wtih a plurality of bushings 50 which are welded or otherwise permanently secured to the drum body and have respective internally threaded bores 51 which are aligned with the openings 47 and 49. The openings 46, 47 and 49 are dimensioned to accommodate freely the threaded shank of a suitable bolt 52, which is adapted to extend through each set of such openings and be tightly screwed into the bores 51 of the bushings 50.

The manner of attaching the outboard ring member 38 to the drum 22 will best be comprehended from FIGS. 6 and 7. As clearly shown in FIG. 6, the circumferential widths of the spaces between struck-out parts 48 of the drum body 22a are somewhat larger than the circumferential widths of the projecting parts 44 of the outboard ring member 38. At the same time, the spaces or gaps between the bent up struck-out parts 48 of the drum body and the radially outwardmost portion 45 of the drum body which they overlie are sufficient to accommodate the thickness of the projecting parts 44 of the outboard ring member. To connect the latter to the drum, therefore, the said projecting parts are first introduced into the spaces between the struck-out parts of the drum body (FIG. 6) and the ring member is then rotationally displaced, for example in the direction of the arrow shown in FIG. 6, to shift the projecting parts 44 into the respective spaces between the struck-out parts 48 and the radially outwardmost portion 45 of the drum body. This operation is continued until the openings 46 are aligned with the openings 47 and 49 and the bores 51 (FIG. 7). When the ring member 38 has reached this position, the bolts 52 are screwed into the bushings 50 and tightened against the outermost surfaces of the struck-out parts 48. Here too it will be understood that, as in the case of the inboard ring member, the number of sets of associated struck-out parts, projecting parts, bushings and bolts can be varied as desired, depending on the strength of the connection required, but again it is contemplated that preferably at least ten and possibly as many as twelve or more such fastening means should be utilized.

The manner in which a tire 21, having a pair of inboard and outboard ring members 37 and 38 adhered thereto, is mounted on and attached to a drum 22 will now be described. For the purposes of this description, it should be noted, it is assumed that the drum has already been itself mounted on a vehicle axle hub 23 and securely fastened thereto by means of bolts 23a, but it will be understood that the tire could be mounted on and attached to the drum first while the latter is held in a suitable fixture or jig off the vehicle, with the entire combination then being transferred to the vehicle. The term "vehicle axle-borne drum" as used herein should, therefore, be interpreted as denoting a drum which either is or subsequently will be secured to a vehicle axle hub.

As the first step of the operation, then, two circumferentially continuous strip- or layer-shaped quantities 53 and 54 of a suitable sealant, preferably a sealing compound of any of the hereinbefore referred to types disclosed by U.S. Pat. Nos. 3,981,342, 4,012,567 and 4,064,922, are applied to the outer surface of the drum 22, one at the inboard region where the skirt 22b merges into the portion 25a of the flange section 25, and one at the region of juncture between the outboard end of the skirt and the radially outwardmost portion 45 of the drum body 22a. Thereafter, the tire 21, with the inboard ring member leading, is fitted over the skirt portion 22b of the drum in the direction of the arrow shown in FIG. 2, until the sections 37b, 37c and 37d of the ring member 37 lie fully on the corresponding portions of the flange section 25 of the drum skirt and the ring member section 37a presses tightly against the quantity of sealant 53 at the portion 25a of the drum skirt. The fitting of the inboard ring member over the drum skirt is, of course, greatly facilitated by the fact that the skirt tapers, albeit at a relatively shallow angle of about 3° to the tire axis, from the flanged inboard end to the unflanged outboard end of the drum, thus being somewhat narrower at the outboard end. During this stage of the operation, of course, care must be taken that the tire is being manipulated so as to have the projecting parts 44 of the outboard ring member 38 lined up with the circumferential spaces between the bent up struck-out parts 48 of the drum body 22a. When the inboard ring member is seated against the skirt flange section 25, therefore, the openings 40 and 41, though in circumferential alignment, will be out of vertical registry with each other, as shown in FIG. 8, to an extent corresponding to the then existing off-sets between the openings 46 and 49.

Once this condition has been attained, the outboard sidewall 28 of the tire is pushed inboardly until the projecting parts 44 of the outboard ring member are received in the spaces between the struck-out parts 48 and are pressed against the quantity of sealant 54, with the projecting parts circumferentially aligned with the gaps between the drum body portion 45 and the struck-out parts 48. The tire is then rotationally displaced, in the direction of the arrows shown in FIGS. 6 and 8, to bring the projecting parts 44 into the said gaps or spaces behind the struck-out parts 48, this movement being continued until the openings 46 come into alignment with the openings 47/49 and the bore 51, at which time the openings 40 in the inboard ring member extension 37d will likewise have come into vertical registry with the openings 41 in the skirt flange extension 25d. The respective bolts 42 and 52 can then be fitted through their respective sets of aligned holes and tightened in place, in the one case by the affixation of the nuts 43 onto the bolts 42 and in the other case by the screwing of the bolts 52 into the bores 51, thereby to securely attach the ring members to the drum. The tightening of the ring members 37 and 38 in place is, of course, effected with at least some of the respective quantities of sealant being confined between the ring members and the drum, while the remaining portions of the sealant lie outside these regions of confinement but still along the respective regions of juncture between the ring members and the drum, as shown in FIG. 1. The interior of the tire is thus rendered fully airtight, with no possibility of air losses occurring past the ring members.

As previously mentioned, it is contemplated by the present invention that, although the mounting procedure described is relatively simple, it should be sufficiently difficult to discourage its being attempted by any person (including the driver) not equipped with special tools. It is to this end that the bolts 23a and 52 both are shown as being provided, for example, with internally hexagonal heads (FIGS. 6 and 7) requiring special tools for their manipulation. Thus, in the event of the tire 21 becoming punctured and deflated, the motorist will normally not be able to demount the flat tire and replace it by a spare. Rather, he or she will be forced to proceed to the nearest service station for the performance of such repairs as will be necessary. Such a course of conduct would, of course, be very likely to create severe difficulties in the case of an ordinary tire/wheel combination having substantially no run-flat capability, since in that case, if the vehicle were to be driven a considerable distance with the tire flat, either the tire or the wheel rim or both could be substantialy ruined and rendered completely unfit for further use. Thus, the ability to change a flat tire (i.e. to replace it with a spare tire) is an almost absolute necessity in the case of a vehicle riding on conventional tire/wheel combinations. A tire/drum combination according to the present invention is not so restricted, however. Thus, since by virtue of its adhesion to the ring members and the fastening of the latter to the drum, the tire 21 cannot become separated from the ring members, the tire/drum combination according to the present invention does not possess a substantial run-flat capability and could be driven for considerable distances at reasonable speeds wtihout risking ruination of either the tire or the drum.

Reverting now to the mounting operation described above, once that operation has been completed and the tire is securely mounted, it is necessary to inflate the tire to the desired operating pressure. To this end the present invention contemplates the provision of a novel valving system for the tire which avoids the needs for the inclusion of a standard tire inflation valve in the outboard ring member. Such valves, as has been mentioned previously, frequently lead to air losses from the tire, which may take place either through the valve itself because of dirt or some mechanical defect therein or through the hole in the wheel rim in which the valve is mounted.

Referring now more particularly to FIG. 10, the valving system according to the present invention by which this problem is effectively overcome includes, in the illustrated form, a small depression or embossment 55 in the outboard ring member 38, the bottom of which depression is directed outwardly of the tire. A small hole 56 provided in the bottom of the depression 55 constitutes a passageway which is open both at the inside surface and at the outside surface of the ring member. The depression contains a quantity of sealant 57, preferably the same sealant as is used to seal the regions of juncture between the ring members and the drum, which is in direct contact with the ring member surface and completely covers the opening 56. The depression is located intermediate on the one hand the zone of adhesion between the bead 30 and the ring member 38 and on the other hand the region where the ring member 38 adjoins the outer peripheral portion of the drum 22. It will be understood, in this regard, that the quantity of sealant 57 could be applied separately to the interior of the depression 55 at the same time as the quantities of the sealant 53 and 54 are applied to the outer surface of the drum. Alternatively, it would also be possible to avoid this separate step and to utilize the quantity of sealant 54 to cover the opening in the bottom of the depression, which could be done by making this quantity of sealant sufficient that when the outboard ring member is pressed against the drum some of the sealant would be forced to flow into the depression 55 and thereby to cover the opening 56. In any event, it will be apparent that the sealant will thereafter prevent any flow of air through the opening 56, while inflation of the tire can be effected very simply by extending an inflation needle 58, having an air outlet opening 59 at one end and connected to an air hose 60 at its other end, through the opening 56 and the quantity of sealant 57. Upon insertion of the needle through the sealant (FIG. 11) the same will flow closely around the needle and escape of air will not be possible, while upon completion of the inflation operation and withdrawal of the needle (FIG. 12), the sealant will be drawn into the hole previously formed by the needle so as to seal the same as fully as if it had never existed.

As previously mentioned, one of the principal objectives of the present invention is the provision of an optimized construction of the tire/drum combination. To this end it is contemplated by the present invention to establish certain relations between the dimensions g, h and R of the tire and the dimension j of the mounting system (all of which dimensions are shown in FIG. 1) and hence to establish certain relations between as well as value ranges for the aspect ratio $\lambda$, the height ratio $\theta$ and the ring width ratio $\nu$. These ratios are represented by the equations $$\lambda = h/g,$$

$$\theta = h/R, \text{ and}$$

$$\nu j/g,$$

where g is the distance, in a direction parallel to the tire axis, between the most widely separated portions of the sidewalls of the tire; h is the radial dimension of the tire as measured from the toe ring diameter to a line parallel to the tire axis and tangent to the outer surface of the tread at its apex (i.e. where it is intersected by the median equatorial or mid-circumferential plane of the tire); j is the distance, in a direction parallel to the tire axis, between the outer extremities of the adhesion zones, i.e. between the laterally outwardmost ends of the sidewall-supporting extensions 37c and 38c, of the inboard and outboard ring members; and R is the radial distance from the axis of the tire to the aforesaid line tangent to the tread at its apex. For the purposes of the present invention, the aspect ratio, the height ratio and the ring width ratio conform substantially to the relations $$\lambda = 0.236/\theta,$$

$$0.32 < \theta < 0.39, \text{ and}$$

$$\nu = 1 - \lambda/4,$$

and with the height ratio at its maximum being lower than the minimum height ratio of conventional P-metric tires (0.40 and above to more than 0.50), an aspect ratio as low as 0.60 or so and in any event lower than about 0.74 can be achieved. In this regard, it should be noted that, for the purpose of the present invention, the value of $\lambda$ (the aspect ratio) characterizing the tire need not lie precisely on the curve represented by a plot of $\lambda$ against $\theta$ in accordance with the first two of the above relations, but could deviate therefrom to a limited degree, say to the extent of about ±5%, and the term "conform substantially" as used herein with respect to the aspect ratio should, therefore, be interpreted as embracing a deviation of this magnitude. The existence and maintenance of these relations, in conjunction with the other physical characteristics of the tire/drum combination hereinbefore described, enables a minimization of stresses in the sidewalls to be achieved along with good tire performance (wear resistance, fatigue resistance, ride and handling), a reduction in tire weight for a given load-carrying capacity, the ability to use a single ply carcass having low ply turn-ups around lighter and thinner bead reinforcements, and the ability to eliminate the usual spare tire altogether.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. In combination, a pneumatic tire which has a generally toroidal shape defining a circumferential crown region, a tread overlying the crown region, and a pair of sidewalls extending generally radially inwardly from the tread and terminating in a pair of circumferential interiorly reinforced beads, and a mounting system for the tire;

characterized in that the mounting system includes:

(a) a drum having a body adapted to be secured to the hub of a vehicle axle, and a peripheral skirt secured to said body and extending therefrom in the inboard direction of the vehicle when the drum is properly mounted on the hub of the vehicle axle, said skirt being provided at its inboard lateral boundary with a circumferential flange section and being devoid of any flange section at its outboard lateral boundary;

(b) two ring members each defining a respective bead seat, an associated bead restraining flange and an associated sidewall-supporting extension of the latter are adhered to the tire at the inboard and outboard sides of the tire, respectively, the zone of adhesion in each case extending over the surface of the foot and the outer side of the respective bead and thence over the surface of the portion of the associated sidewall located just radially outwardly of and contiguous to that bead, and the inboard one of said ring members having contours corresponding substantially to those of said flange section of said skirt;

(c) first attachment means releasably secure the inboard one of said ring members to said skirt along said flange section;

(d) second attachment means releasably secure the outboard one of said ring members to said drum body adjacent the outboard lateral boundary of said skirt, said outboard ring member being contoured to dispose the outboard bead seat, bead restraining flange and sidewall-supporting extension defined by said outboard ring member at locations relative to the axis of the tire corresponding to the locations of the inboard bead seat, bead restraining flange and sidewall-supporting extension defined by said inboard ring member; and (e) respective quantities of a sealant having self-sealing properties are located at the circumferential regions of juncture between said ring members and said skirt for rendering the interior of the tire airtight.

2. In combination, (A) a pneumatic tire which has a generally toroidal shape defining a circumferential crown region, a tread overlying the crown region, a pair of sidewalls extending generally radially inwardly from the tread and terminating in a pair of circumferential interiorly reinforced beads, a reinforcing carcass underlying the tread and sidewalls of the tire, the carcass including a ply of tire cords disposed in substantially radial planes of the tire and extending from one bead to the other, the opposite end regions of the ply being turned up around the interior reinforcements of the beads, and a tread-reinforcing belt of tire cords underlying the tread in the crown region of the tire, and (B) a mounting system for the tire;

characterized in that the mounting system includes:

(a) a drum having a body adapted to be secured to the hub of a vehicle axle, and a peripheral skirt secured to said body and extending therefrom in the inboard direction of the vehicle when the drum is properly mounted on the hub of the vehicle axle, said skirt being provided at its inboard lateral boundary with a circumferential flange section and being devoid of any flange section at its outboard lateral boundary;

(b) two ring members each defining a respective bead seat, an associated bead restraining flange and an associated sidewall-supporting extension of the latter are adhered to the tire at the inboard and outboard sides of the tire, respectively, the zone of adhesion in each case extending over the surface of the foot and the outer side of the respective bead and thence over the surface of the portion of the associated sidewall located just radially outwardly of and contiguous to that bead, and the inboard one of said ring members having contours tours corresponding substantially to those of said flange section of said skirt;

(c) first attachment means releasably secure the inboard one of said ring members to said skirt along said flange section;

(d) second attachment means releasably secure the outboard one of said ring members to said drum body adjacent the outboard lateral boundary of said skirt, said outboard ring member being contoured to dispose the outboard bead seat, beat restraining flange and sidewall-supporting extension defined by said outboard ring member at locations relative to the axis of the tire corresponding to the locations of the inboard bead seat, bead restraining flange and sidewall-supporting extension defined by said inboard ring member; and (e) respective quantities of a sealant having self-sealing properties are located at the circumferential regions of juncture between said ring members and said skirt for rendering the interior of the tire airtight;

and further characterized in that in the tire the turned-up portions of said carcass ply terminate within the respective zones of adhesion between said sidewall-supporting extension of said ring members and the portions of the associated sidewalls juxtaposed thereto, thereby to ensure the absence of any mechanical discontinuities in the portions of the sidewalls which are located radially outwardly of said supported sidewall portions and are subject to flexure during operation of the tire.

3. The combination claimed in claim 1 or 2, characterized in that in the mounting system said outboard ring member is provided with a depression having its bottom directed outwardly of the tire and located intermediate said zone of adhesion and the portion of that ring member where the same adjoins said drum, said outboard ring member being further provided with a small hole in the bottom of said depression, and said depression containing a further quantity of a sealant having self-sealing properties, said depression and said further quantity of sealant contained therein thereby constituting a valving system for the tire adapted to permit inflation of the tire by insertion of a hollow inflation needle through said hole and said further quantity of sealant.

4. The combination claimed in claim 1 or 2, characterized in that in the mounting system said first attachment means include a circumferential laterally outwardmost portion of said inboard ring member contiguous with said inboard sidewall-supporting extension and having a plurality of openings therein, a circumferential laterally outwardmost portion of said flange section of said skirt closely underlying said laterally outwardmost portion of said inboard ring member and having a plurality of openings therein each corresponding to a respective one of said openings in said laterally outwardmost portion of said inboard ring member, and a plurality of fastening members extending through the respective associated ones of said openings in said laterally outwardmost portions of said inboard ring member and said flange section of said skirt and tightly securing the same to one another.

5. The combination claimed in claim 1 or 2, characterized in that in the mounting system said second attachment means includes a circumferential radially outwardmost portion of said body of said drum having a plurality of openings therein, a circumferential laterally inwardmost portion of said outboard ring member closely overlying said radially outwardmost portion of said drum body and having a plurality of openings therein each corresponding to a respective one of said openings in said radially outwardmost portion of said drum body, and a plurality of fastening members extending through the respective associated ones of said openings in said laterally inwardmost portion of said outboard ring member and said radially outwardmost portion of said drum body and tightly securing the same to one another.

6. The combination claimed in claim 5, characterized in that in the mounting system said drum body has a plurality of circumferentially spaced struck-out parts each located radially inwardly of said radially outwardmost portion of said drum body and bent up to overlie a respective one of said openings in that portion of said drum body at a spacing therefrom sufficient to accommodate said laterally inwardmost portion of said outboard ring member, each of said struck-out parts having a respective opening therein, said laterally inwardmost portion of said outboard ring member including a plurality of projecting parts each received in a respective one of the spaces between said struck-out parts and said radially outwardmost portion of said drum body, and each of said fastening members extending through a respective associated set of said openings in said struck-out parts, said projecting parts and said radially outwardmost portion of said drum body.

7. The combination claimed in claim 6, characterized in that in the mounting system the circumferential spaces defined between adjacent ones of said bent up struck-out parts of said drum body are somewhat greater than the circumferential widths of said projecting parts of said laterally inwardmost portion of said outboard ring member, thereby to enable said projecting parts to be fitted into said circumferential spaces and then introduced into the spaces between said radially outwardmost portion of said drum body and said struck-out parts of the latter by means of a rotational displacement of said tire relative to said drum.

8. The combination claimed in claim 1 or 2, characterized in that the outer surface of the portion of each sidewall of the tire within said zone of adhesion and said extension of the associated ring member of the mounting system to which that sidewall surface portion is adhered are inclined at an angle of about 25° to the axis of the tire.

9. The combination claimed in claim 1 or 2, characterized in that the surface of the foot of each bead of the tire from its toe to its heel within said zone of adhesion and the bead seat portion of the associated ring member of the mounting system to which that bead foot surface is adhered taper radially inwardly of the tire at an angle of about 5° to the axis of the tire.

10. The combination claimed in claim 1 or 2, characterized in that in the mounting system said skirt tapers radially inwardly at an angle of about 3° to the axis of the tire from said inboard flange section to the outboard lateral boundary of said skirt where the same adjoins said body of said drum.

11. The combination claimed in claim 1 or 2, characterized in that:
(a) the outer surface of the portion of each sidewall of the tire within said zone of adhesion and said extension of the associated ring member of the mounting system to which that sidewall surface portion is adhered are inclined at an angle of about 25° to the axis of the tire;
(b) the surface of the foot of each bead of the tire from its toe to its heel within said zone of adhesion and the bead seat portion of the associated ring member of the mounting system to which that bead foot surface is adhered taper radially inwardly of the tire at an angle of about 5° to the axis of the tire; and
(c) said skirt of the mounting system tapers radially inwardly at an angle of about 3° to the axis of the tire from said inboard flange section to the outboard lateral boundary of said skirt where the same adjoins said body of said drum.

12. The combination claimed in claim 1 or 2, characterized in that the height ratio $\theta = h/R$ and the aspect ratio $\lambda = h/g$ of the tire when the same is in an inflated, unloaded state conform substantially to the relation $$\lambda = 0.236/\theta$$

wherein $0.32 < \theta < 0.39$, R is the radial dimension of the tire from its axis to a first line parallel to the axis and tangent to the outer tread surface at the apex of the crown region, h is the radial dimension of the tire from a second line parallel to the axis and constituting the toe ring diameter of the tire to said first line, and g is the distance, in a direction parallel to the axis, between the most widely separated portions of the two sidewalls.

13. The combination claimed in claim 1 or 2, characterized in that the height ratio $\theta = h/R$, the aspect ratio $\lambda = h/g$ and the ring width ratio $\nu = j/g$ of the tire and drum when the tire is in an inflated, unloaded state conform substantially to the relations $$\lambda = 0.236/\theta \text{ and } \nu = 1 - \lambda/4$$

wherein $0.32 < \theta < 0.39$, R is the radial dimension of the tire from its axis to a first line parallel to the axis and tangent to the other tread surface at the apex of the crown region, h is the radial dimension of the tire from a second line parallel to the tire axis and constituting the toe ring diameter of the tire to said first line, g is the distance, in a direction parallel to the tire axis, between the most widely separated portions of the two sidewalls, and j is the distance, in a direction parallel to the tire axis, between the outer extremities of said sidewall-supporting extensions of said inboard and outboard ring members.

14. The combination claimed in claim 1 or 2, characterized in that the interior reinforcement of each bead of the tire is a single metal member in the form of a single loop having an inner and an outer surface and no free ends, said inner surface of said metal member in cross-section being convexly arcuate.

15. The combination claimed in claim 14, characterized in that each said metal member has a surface area equal to about 50% of the surface area of a conventional multiple-wire multiple-turn bead wire core bundle for reinforcing the beads of a conventional tire of corresponding toe ring diameter.

16. The combination claimed in claim 15, characterized in that each said metal member has a circumferential channel formed therein at said outer surface thereof.

17. The combination claimed in claim 16, characterized in that said inner surface and said channel of each said metal member each has a semicircular curvature in cross-section.

18. The combination claimed in claim 17, characterized in that said inner surface and said channel of said said metal member are cross-sectionally concentric with one another, each said metal member thereby having a uniform cross-sectional thickness.

19. The combination claimed in claim 14, characterized in that an apex strip is incorporated in the portion of each sidewall of the tire located just radially outwardly of and contiguous to the respective bead, each said apex strip extending from the associated interior reinforcement of that bead and terminating beyond said zone of adhesion but radially inwardly of the widest portion of the tire section, the radially inwardmost end region of each said apex strip being located at and mated to said associated interior reinforcement.

20. A pneumatic tire as claimed in claim 19, characterized in that each said apex strip terminates at a line parallel to the axis of the tire and located in the region between ¼ and ⅓ of the height of the tire section as measured from a line parallel to the tire axis and constituting the toe ring diameter of the tire to the apex of the tread.

21. A mounting system for mounting a pneumatic tire on a vehicle axle; the mounting system being characterized in that it includes:
(a) a drum having a body adapted to be secured to the hub of a vehicle axle, and a peripheral skirt secured to said body and extending therefrom in the inboard direction of the vehicle when the drum is properly mounted on the hub of the vehicle axle, said skirt being provided at its inboard lateral boundary with a circumferential flange section and being devoid of any flange section at its outboard lateral boundary;
(b) two ring members each defining a respective bead seat, an associated bead restraining flange and an associated sidewall-supporting extension of the latter, said ring members being adapted to be adhered at said bead seats, said bead restraining flanges and said sidewall-supporting extensions to the corresponding outer surfaces of the respective inboard and outboard beads and sidewalls of the tire, and the inboard one of said ring members having contours corresponding substantially to those of said flange section of said skirt;
(c) first attachment means for releasably securing the inboard one of said ring members to said skirt along said flange section; and
(d) second attachment means for releasably securing the outboard one of said ring members to said drum body adjacent the outboard lateral boundary of said skirt, said outboard ring member being contoured to dispose the outboard bead seat, bead restraining flange and sidewall-supporting extension defined thereby at locations relative to the axis of the tire corresponding to the locations of the inboard bead seat, bead restraining flange and sidewall-supporting extensions defined by said inboard ring member.

22. A mounting system as claimed in claim 21, characterized in that said first attachment means include a circumferential laterally outwardmost portion of said inboard ring member contiguous with said inboard sidewall-supporting extension and having a plurality of openings therein, a circumferential laterally outwardmost portion of said flange section of said skirt adapted to closely underlie said laterally outwardmost portion of said inboard ring member and having a plurality of openings therein each corresponding to a respective one of said openings in said laterally outwardmost portion of said inboard ring member, and a plurality of fastening members adapted to extend through the respective associated ones of said openings in said laterally outwardmost portions of said inboard ring member and said skirt flange section for tightly securing the same to one another.

23. A mounting system as claimed in claim 21 or 22, characterized in that said second attachment means include a circumferential radially outwardmost portion of said body of said drum having a plurality of openings therein, a circumferential laterally inwardmost portion of said outboard ring member adapted to closely overlie said radially outwardmost portion of said drum body, and a plurality of fastening members adapted to extend through the respective associated ones of said openings in said laterally inwardmost portion of said outboard ring member and said radially outwardmost portion of said drum body for tightly securing the same to one another.

24. A mounting system as claimed in claim 23, characterized in that said drum body has a plurality of circumferentially spaced struck-out parts each located radially inwardly of said radially outwardmost portion of said drum body and bent up to overlie a respective one of said openings in that portion of said drum body at a spacing therefrom sufficient to accommodate said laterally inwardmost portion of said outboard ring member, each of said struck-out parts having a respective opening therein, said laterally inwardmost portion of said outboard ring member including a plurality of projecting parts each adapted to be received in a respective one of the spaces between said struck-out parts and said radially outwardmost portion of said drum body, and each of said fastening members being adapted to extend through a respective associated set of said openings in said struck-out parts, said projecting parts and said radilaly outwardmost portion of said drum body.

25. A mounting system as claimed in claim 24, characterized in that the circumferential spaces defined between said bent up struck-out parts of said drum body are somewhat greater than the circumferential widths of said projecting parts of said laterally inwardmost portion of said outboard ring member, thereby to enable said projecting parts to be fitted into said circumferential spaces and then introduced into the spaces between said radially outwardmost portion of said drum body and said struck-out parts of the latter by means of a rotational displacement of said outboard ring member relative to said drum.

26. A mounting system as claimed in claim 21, characterized in that said outboard ring member is provided with a depression located intermediate said outboard bead seat and the portion of that ring member which adjoins said drum when that ring member is secured to said drum, said outboard ring member being further provided with a small hole in the bottom of said depression, and said depression being adapted to contain a quantity of a sealant having self-sealing properties, said depression and said quantity of sealant when contained therein thereby constituting a valving system for the tire adapted to permit inflation of the tire by insertion of a hollow inflation needle through said hole and said quantity of sealant.

27. A mounting system as claimed in claim 21, characterized in that said sidewall-supporting extension of each ring member is inclined at an angle of about 25° to the axis of said drum.

28. A mounting system as claimed in claim 21, characterized in that said bead seat of each ring member tapers radially inwardly of the drum at an angle of about 5° to the axis of the drum.

29. A mounting system as claimed in claim 21, characterized in that said skirt tapers radially inwardly of said drum at an angle of about 3° to the axis of said drum from said inboard flange section to the outboard lateral boundary of said skirt where the same adjoins said body of said drum.

30. A mounting system as claimed in claim 21, characterized in that:
(a) each of said sidewall-supporting extensions of said ring members is inclined at an angle of about 25° to the axis of said drum;
(b) each of said bead seats of said ring members tapers radially inwardly of said drum at an angle of about 5° to the axis of said drum; and
(c) said skirt tapers radially inwardly at an angle of about 3° to the axis of said drum from said inboard flange section to the outboard lateral boundary of said skirt where the same adjoins said body of said drum.

31. A drum for use as part of a mounting system for mounting a pneumatic tire on a vehicle axle:
characterized in that the drum has a body adapted to be secured to the hub of a vehicle axle, a peripheral skirt secured to said body and extending therefrom so as to be oriented in the inboard direction of the vehicle when the drum is properly mounted on the hub of the vehicle axle, said skirt being provided at its inboard lateral boundary with a circumferential flange section and being devoid of any flange section at its outboard lateral boundary, said flange section of said skirt having a circumferential laterally outwardmost portion provided with first adjunct means constituting a part of an attachment system for releasably securing the inboard one of a pair of tire-supporting ring members to said skirt along said flange section, said drum body adjacent the outboard lateral boundary of said skirt having a circumferential radially outwardmost portion provided with second adjunct means constituting a part of an attachment system for releasably securing the outboard one of a pair of tire-supporting ring members to said radially outwardmost portion of said drum body and said first adjunct means includes a plurality of openings in said laterally outwardmost portion of said flange section each corresponding to a respective one of a plurality of openings in the inboard one of said ring members and each adapted to receive a respective one of a plurality of fastening members.

32. A drum as claimed in claim 31, characterized in that said second adjunct means includes a plurality of openings in said radially outwardmost portion of said drum body each corresponding to a respective one of a plurality of openings in a circumferentially laterally inwardmost portion of the outboard one of said ring members and each adapted to receive a respective one of a plurality of fastening members.

33. A drum as claimed in claim 32, characterized in that said drum body has a plurality of circumferentially spaced struck-out parts each located radially inwardly of said radially outwardmost portion of said drum body and bent up to overlie a respective one of said openings in said radially outwardmost portion of said drum body at a spacing from the latter sufficient to accommodate said laterally inwardmost portion of the outboard one of said ring members, said struck-out parts having respective openings therein corresponding to said openings in said radially outwardmost portion of said drum body and each adapted to receive a respective one of said fastening members.

34. A drum as claimed in claim 33, characterized in that the circumferential spaces defined between said bent up struck-out parts of said drum body are sufficiently great to accommodate respective ones of a plurality of projecting parts provided on said laterally inwardmost portion of the outboard one of said ring members, thereby to enable said projecting parts to be fitted into said circumferential spaces and then introduced into the spaces between said radially outwardmost portion of said drum body and said struck-out parts by means of a rotational displacement of the outboard one of said ring members relative to said drum.

35. A drum as claimed in claim 31, characterized in that said skirt tapers radially inwardly of the drum at an angle of about 3° to the axis of the drum from said inboard flange section to the outboard lateral boundary of said skirt where the same adjoins said body of said drum.

* * * * *